(12) United States Patent
Tharp

(10) Patent No.: US 11,325,079 B2
(45) Date of Patent: May 10, 2022

(54) COMBINED COARSE AND FINE BUBBLE DIFFUSER

(71) Applicant: Environmental Dynamics International, Inc., Columbia, MO (US)

(72) Inventor: Charles E. Tharp, Columbia, MO (US)

(73) Assignee: ENVIRONMENTAL DYNAMICS INTERNATIONAL, INC., Columbia, MO (US)

( * ) Notice: Subject to any disclaimer, the term of this patent is extended or adjusted under 35 U.S.C. 154(b) by 164 days.

(21) Appl. No.: 16/413,747

(22) Filed: May 16, 2019

(65) Prior Publication Data

US 2020/0360873 A1 Nov. 19, 2020

(51) Int. Cl.
*B01F 3/04* (2006.01)
*C02F 3/20* (2006.01)

(52) U.S. Cl.
CPC ........ *B01F 3/04241* (2013.01); *B01F 3/0412* (2013.01); *C02F 3/20* (2013.01); *B01F 2003/04297* (2013.01); *B01F 2003/04361* (2013.01); *C02F 2201/002* (2013.01)

(58) Field of Classification Search
CPC ............... B01F 3/04241; B01F 3/0412; B01F 2003/04141; B01F 2003/04297; B01F 2003/04361; C02F 3/20; C02F 2201/002
USPC ........... 261/77, 122.1, 126, 69.1, 121.1, 123
See application file for complete search history.

(56) References Cited

U.S. PATENT DOCUMENTS

| 4,486,361 | A | * | 12/1984 | Durot ..................... | C02F 3/223 |
|---|---|---|---|---|---|
| | | | | | 261/123 |
| 4,869,852 | A | * | 9/1989 | Goudy, Jr. .......... | B01F 3/04106 |
| | | | | | 261/122.1 |
| 4,917,832 | A | * | 4/1990 | Marcum ............. | B01F 3/04262 |
| | | | | | 261/120 |
| 6,036,357 | A | * | 3/2000 | Van Drie ............ | B01F 3/04113 |
| | | | | | 366/332 |
| 6,162,020 | A | | 12/2000 | Kondo | |

(Continued)

OTHER PUBLICATIONS

"MARS(TM) Aerator Features". Triplepoint Water Technologies, LLC, pp. 1-3. [[Accessed at http://www.triplepointwater.com/mars-aeration-brochure/#.XVG-2K9Ya84 on Aug. 12, 2019]].

(Continued)

*Primary Examiner* — Charles S Bushey
(74) *Attorney, Agent, or Firm* — Husch Blackwell LLP

(57) ABSTRACT

A system and method for aerating and mixing wastewater that includes fine bubble diffusers located at least partially below a large bubble mixer. At least a portion of the gas discharged from the fine bubble diffusers is captured by the large bubble mixer and is reused by the large bubble mixer to form and release intermittent large bubbles. Prior to being captured by the large bubble mixer, the gas discharged by the fine bubble diffusers can aerate the wastewater. The large bubble mixer includes an accumulator that, upon becoming filled with gas, generates and releases a large bubble. Upon discharge from the large bubble mixer, the large bubbles generated therein may separate into a plurality of coarse bubbles for providing additional oxygen transfer and mixing of the wastewater. The system may include supply lines for supplying gas only to the fine bubble diffuser.

22 Claims, 8 Drawing Sheets

(56) References Cited

U.S. PATENT DOCUMENTS

| | | | |
|---|---|---|---|
| 6,322,056 B1* | 11/2001 | Drie | B01F 15/00525 |
| | | | 261/81 |
| 6,406,624 B1* | 6/2002 | DeVos | B01D 21/0027 |
| | | | 210/208 |
| 6,554,259 B2* | 4/2003 | Van Drie | B01F 15/00525 |
| | | | 261/81 |
| 7,121,532 B2* | 10/2006 | Oades | C02F 3/20 |
| | | | 261/23.1 |
| 7,294,255 B2 | 11/2007 | Kondo | |
| 7,374,675 B2 | 5/2008 | Koopmans et al. | |
| 8,047,808 B2 | 11/2011 | Kondo | |
| 8,292,271 B2* | 10/2012 | Fujisato | C02F 1/74 |
| | | | 261/116 |
| 9,073,024 B2* | 7/2015 | Drewry | B01F 13/02 |
| 9,566,554 B2* | 2/2017 | Wu | B01F 13/0283 |
| 2011/0049047 A1* | 3/2011 | Cumin | B01D 65/00 |
| | | | 210/636 |
| 2013/0153494 A1* | 6/2013 | Wang | C02F 3/006 |
| | | | 210/620 |
| 2020/0114319 A1 | 4/2020 | Galbreath-O'Leary et al. | |
| 2020/0238229 A1 | 7/2020 | Hill | |
| 2021/0276902 A1* | 9/2021 | Neu | B01F 13/0255 |

OTHER PUBLICATIONS

Geyser Pump, Wastewater Product Catalog, 2014, 22 pages, Geyser Pump Tech, LLC.

* cited by examiner

COMBINED COARSE AND FINE BUBBLE DIFFUSER

FIELD OF THE INVENTION

The present invention is generally directed to the field of wastewater treatment by diffusion, and more particularly to the combination of fine air diffusion and coarse bubble mixing working in tandem in a single system.

BACKGROUND

In the treatment of wastewater, fine bubble diffuser systems and coarse bubble mixing systems each provide respective benefits relating to the aeration and mixing of wastewater.

Traditionally, fine bubble diffusion is used in wastewater treatment to provide mass transfer of oxygen to the water. Fine bubble diffuser systems typically release fine air bubbles, in the size range of about 0.5 mm to 3.0 mm in diameter for example, into the wastewater in order to provide a large amount of surface area contact with the wastewater. These small, fine bubbles are beneficial in that they are efficient in transferring oxygen to the wastewater and thus enhance the overall efficiency of the diffusion process. The influx of oxygen, in combination with the sewage in the wastewater, allows bacteria to produce enzymes which help break down the waste. Fine bubble diffusion can also promote movement of the water to prevent water stagnation.

Coarse bubble systems, on the other hand, typically offer moderate oxygen transfer efficiency, while providing an increased turbulence and mixing capability. Coarse bubble systems typically release larger air bubbles having a greater diameter and smaller amount of contact area. Coarse bubble systems will typically transfer oxygen at half the efficiency as fine bubble diffusers. While coarse bubble systems are not as efficient in transferring oxygen to the wastewater, they are capable of displacing more wastewater and thus creating turbulence in the wastewater, which would otherwise be less pronounced with smaller bubbles (i.e., fine bubbles).

Traditionally, consumers choose to install either a fine air bubble diffusion system or a coarse bubble diffusion system. Recently however, there is a market for both systems working in tandem. An example of one such combined device is the MARS™ Aerator offered by Triplepoint Water Technologies LLC. This aerator includes a static coarse bubble tube and a fine bubble tubular diffusers mounted to a common base.

Currently known combined systems are not without problems in efficiency and use. For example, known systems have only a single splitting orifice that controls the airflow supplied to both the fine bubble diffusers and the coarse bubble mixer. This engineered splitting orifice only provides the proper splitting of air between the fine bubble diffusers and coarse bubble mixer at a single, specified airflow. If the air pressure drops for example, significantly less air is discharged through the fine bubble diffusers, while a generally constant volume of air may still be discharged from the coarse bubble mixer. At higher air pressures, more than a desired amount of the airflow may be directed to the fine bubble diffuser. The result is a system that is adapted for operating at a single design point, with little to no flexibility for loading above or below the design point.

Maintaining constant and desired airflow distribution between the coarse bubble mixer and the fine bubble diffusers is a problem that amplifies once new units are moved from testing facilities into wastewater treatment plants and lagoons. Materials in the liquid can deposit on and build-up on the fine bubble diffusers to clog or partially clog the perforations and reducing the efficiency of the diffuser. As this occurs, air distribution or design airflow to each of the fine bubble diffuser and coarse bubble mixer becomes even harder to achieve. The longer these systems are in use, the worse they perform.

Additionally, because each diffuser unit only has one orifice for receiving air, each unit must have an individual airline connected to each diffuser unit. Because each unit has its own air unit, uniform airflow amongst multiple units is nearly impossible.

Further yet, when air is supplied to currently known combined systems, the supplied air is used only once, and for one purpose. For example, the supplied air or gas is split by the orifice to either the fine air diffuser for oxygen transfer or to the coarse bubble mixer for water disruption. When the air is discharged by either system, no portion of the discharged air or gas is reused for a different purpose or otherwise used again.

Even when currently known combined systems are working correctly, there is a design flaw in achieving maximum efficiency. Because coarse bubble mixers transfer oxygen at only half the level of fine bubble diffuser, currently known combined systems will never be able to achieve oxygen transfer of a fine bubble diffuser. Because the supplied airflow is being split to both the coarse bubble mixer and the fine air diffuser, the portion of the airflow directed to the coarse bubble mixer will only transfer oxygen at half the efficiency of fine bubble diffusers.

Accordingly, a need exists for a combined coarse and fine bubble diffuser system that provides balanced and desired airflow to both the coarse bubble mixer and the fine bubble diffusers. A need also exists for a combined coarse and fine bubble diffuser system that provides long-term consistent performance without sacrificing efficiency and effectiveness. An additional need exists for a combined coarse and fine bubble diffuser system that has increased efficiency. A further need exists for a combined coarse and fine bubble diffuser system having a simple and reliable design.

SUMMARY OF THE INVENTION

The present invention involves the provision of a system and method for aerating and mixing a liquid, such as wastewater. One or more fine bubble diffusers and one or more large or coarse bubble mixers are provided in a particular arrangement or subsystem. The fine bubble diffusers can be configured for discharging or diffusing gas into the liquid in the form of fine bubbles. The large bubble mixer may be configured for intermittently discharging large bubbles that, upon exiting the large bubble mixer, may break into a plurality of smaller coarse bubbles.

In a preferred embodiment of the present invention, the large bubble mixer, or at least a portion thereof, is located above the fine bubble diffusers. Put differently, the fine bubble diffusers are located generally beneath, or at a depth lower than, the large bubble mixer. In particular, the large bubble mixer can have an accumulator with a peripheral skirt and at least a portion of one or more of the fine bubble diffusers may be located beneath the skirt. In one embodiment, at least one fine bubble diffuser is located directly below the accumulator of the large bubble mixer. Other of the fine bubble diffusers may be located only partially below the accumulator of the large bubble mixer (i.e., not fully located directly below the accumulator).

At least a portion of the gas discharged from the fine bubble diffusers is subsequently captured by the large bubble mixer. Prior to being captured by the large bubble mixer, the gas discharged from the fine bubble diffuser aerates the wastewater. The gas captured by the large bubble mixer is accumulated within the large bubble mixer to generate a large bubble that again, upon exiting the large bubble mixer, may break into a plurality of smaller coarse bubbles. The large bubble mixer can be configured to discharge a large bubble once the accumulator becomes at least substantially or fully filled with gas. Once formed, the large bubble is released from an upper end of the large bubble mixer. As such, the large bubble mixer may be adapted for operating as a siphon to generate one large bubble per discharge cycle.

In one embodiment, the system comprises a single supply line that supplies gas to the fine bubble diffuser(s). In an alternative embodiment, the system comprises two supply lines—one that supplies gas to the fine bubble diffuser(s) and one that supplies gas to the large bubble mixer. These two lines may be controlled independently from one another such that the amount and flow of gas supplied to the fine bubble diffusers is independent of the amount and flow of gas supplied to the large bubble mixer.

The present invention also involves a method of aerating and mixing a liquid, such as wastewater, wherein the system described above may be implemented. In one embodiment of this method, one or more fine bubble diffusers and one or more large or coarse bubble mixers are provided and gas is supplied only to the fine bubble diffuser. At least a portion of the gas discharged by the fine bubble diffusers may be captured by the large bubble mixer. In other words, the gas captured by the large bubble mixer is reused for additional oxygen transfer and mixing after it is used for aerating or oxygenating the liquid upon discharge from the fine bubble diffuser(s).

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DESCRIPTION OF THE INVENTION

Figure 1:
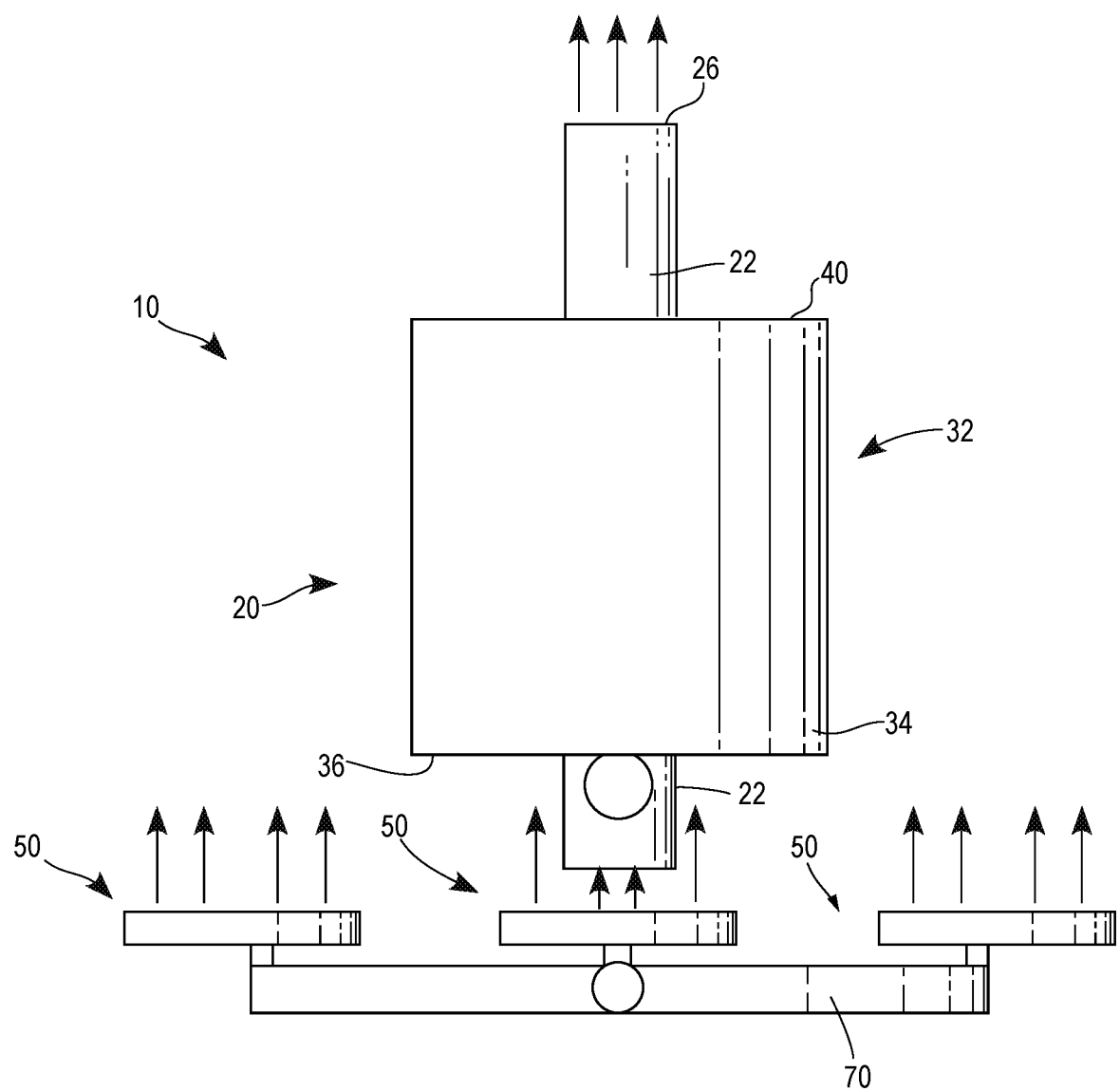
FIG. 1 is a side view of a combined large/coarse and fine bubble diffuser system using fine bubble disc diffusers in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be appreciated that any dimensions included in the drawing figures are simply provided as examples and dimensions other than those provided therein are also within the scope of the invention.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to a combined large/coarse and fine bubble diffuser system and to a process of combining a coarse bubble mixer with a fine bubble diffuser in a way such that the fine bubble diffuser supplies air or gas for use by the coarse bubble mixer. This combination allows for maximum fine bubble oxygen transfer and mixing from the fine bubble diffusers, plus additional mixing and oxygen transfer from the coarse bubble mixer. It should be noted that, as used herein, the terms "large/coarse bubble mixer," "large bubble mixer," and "coarse bubble mixer" may be used interchangeably and all refer to the same device, as further described below. In a preferred embodiment of the present invention, the large/coarse bubble mixer may be adapted for generating a single large bubble each at each discharge that will, upon exit from the stack pipe, split or burst into multiple coarse bubbles.

One embodiment of the present invention 10 is used in wastewater treatment aeration systems and combines the mixing capabilities of a coarse bubble mixer 20 with the oxygen transferring capabilities of fine bubble diffusers 50. The fine bubble diffusers 50 are designed for transferring oxygen to the wastewater in order to promote bacterial growth and the breakdown of waste and contaminants therein. The coarse bubble mixer 20 can be adapted for generating large bubbles for both oxygen transfer and for disturbing the wastewater and displacing and dispersing oxygen in the wastewater.

By combining the coarse bubble mixer 20 and fine bubble diffuser 50 in the manner and configuration disclosed herein, only one source of gas or air is needed, and there can be a generally uniform distribution of oxygen to each unit. This combination also utilizes one supply of air or gas for multiple purposes, for increased efficiency when compared to current combination systems.

As illustrated in FIG. 1, one embodiment of the combined system 10 is adapted for connection to a lateral air distribution pipe, such as the pipe 70, which may be submerged or may be floating on the surface of the liquid. As shown, air or other gas may be supplied to the pipes 70 and discharged into a tee-fitting 60 (the actual connection is not shown in the figures, but the tee-fitting 60 would be threaded or otherwise connected to the pipe 70). The combined system 10 includes fine bubble diffusers 50 connected to the pipes 70 using a threaded connection or other possible fastening means, such as clamps, bolts or other types of suitable fasteners. The tee-fitting 60 provides an opening and path to allow air or gas from the lateral pipe 70 to enter the fine bubble diffusers 50. The fine bubble diffusers 50 discharge air or gas as fine bubbles into the wastewater. The pipes 70 may be constructed from any suitable material including, but not limited to, PVC, CPVC, ABS, stainless steel, galvanized iron, galvanized steel, and other suitable materials.

While FIGS. 1, 2A, 2B and 2C depict a system 10 having fine bubble diffusers 50 in the form of disc diffusers, it is to be understood that the present invention is equally applicable to disc diffusers, tube diffusers, panel diffusers, any other suitable type of fine bubble diffuser now known or hereafter developed, or combinations thereof.

Figure 5:
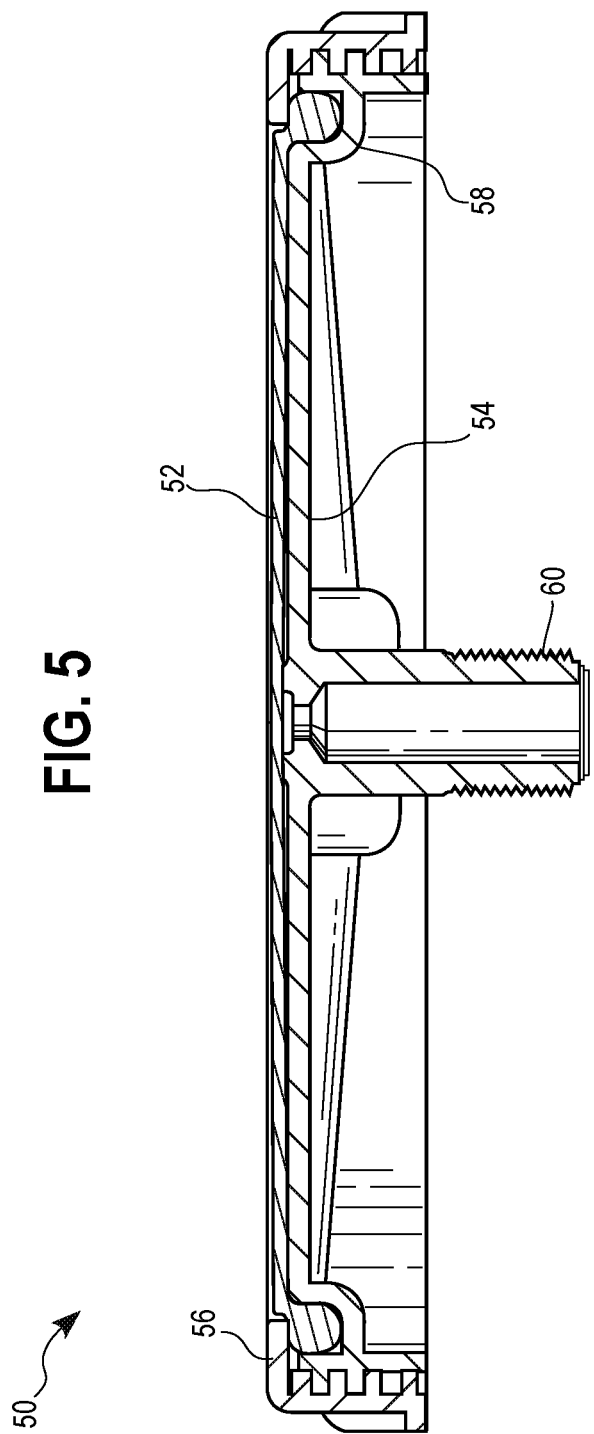
FIG. 5 is a schematic side sectional view of a fine bubble disc diffuser in accordance with one embodiment of the present invention.

An example of a fine air bubble diffuser 50 is depicted in FIG. 5. As air or other gas is applied to fine air bubble diffuser 50, a perforated or porous membrane 52, on top of the diffuser body 54, will expand from the diffuser body 54, thus opening perforations in the membrane 54 and discharging the air or gas through the perforations into the liquid in the form of fine bubbles which are beneficial in that they efficiently transfer the gas to the liquid. When the gas pressure is relieved, the flexible perforated membrane 52 collapses back onto the diffuser body 54 and thus closes the perforations so that the liquid is unable to leak into the diffuser. The membrane 52 may be held in place on the diffuser body 54 by a solid outer retainer ring 56 and an integrated gasket and precision seal 58.

Again, while a disc diffuser may be implemented as the fine bubble diffuser 50 in one embodiment, other embodiments may utilize other types and configurations of fine bubble diffusers. As mentioned, other possible embodiments may include tube diffusers, panel diffusers, disc diffusers, any other suitable type of fine bubble diffuser now known or hereafter developed, or combinations thereof. Some embodiments may include mounting the fine bubble diffuser system horizontally on a ballast block. While the embodiments of the fine bubble diffuser can have different internal operations, the end result of each embodiment is fine air bubbles being diffused into the wastewater for oxygenation, with a portion of the fine bubbles being captured by the accumulator 32 of the coarse bubble mixer 20 to activate a secondary supplemental coarse bubble mixing and aeration.

One embodiment includes one of more of a plurality of fine bubble diffusers 50 arranged either partially or fully beneath the coarse bubble mixer 20. For example, in the embodiment shown in FIGS. 1 and 2A, the fine bubble diffusers 50 are arranged in a cross fashion, with one fine bubble diffuser 50 located directly underneath the coarse bubble mixer 20, and four fine bubble diffusers 50 arranged generally equally around the coarse bubble mixer 20. In the embodiment shown in FIG. 2B, one fine bubble diffuser 50 is located directly and fully underneath the coarse bubble mixer 20, and four fine bubble diffusers 50 located partially underneath the coarse bubble mixer 20. The embodiment illustrated in FIG. 2C includes four fine bubble diffusers 50 located partially underneath the coarse bubble mixer 20. In other embodiments, all of the fine bubble diffusers 50 may be located fully beneath the coarse bubble mixer 20. It will be appreciated that numerous other layouts and configurations are also well within the scope of the present invention.

Figure 2A:
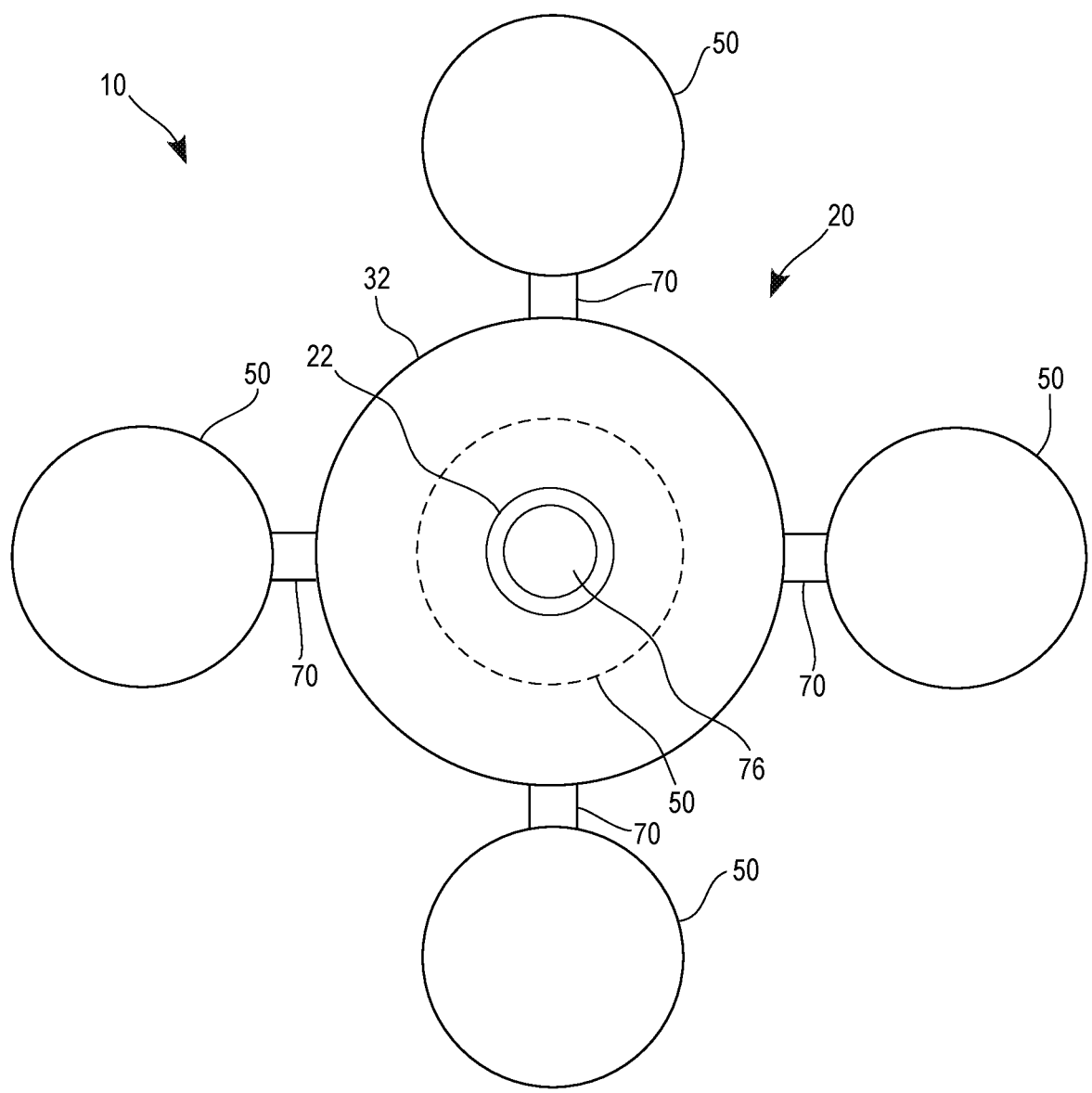
FIG. 2A is a top side schematic view of a combined large/coarse and fine bubble diffuser system using fine bubble disc diffusers in accordance with one embodiment of the present invention.
Figure 2B:
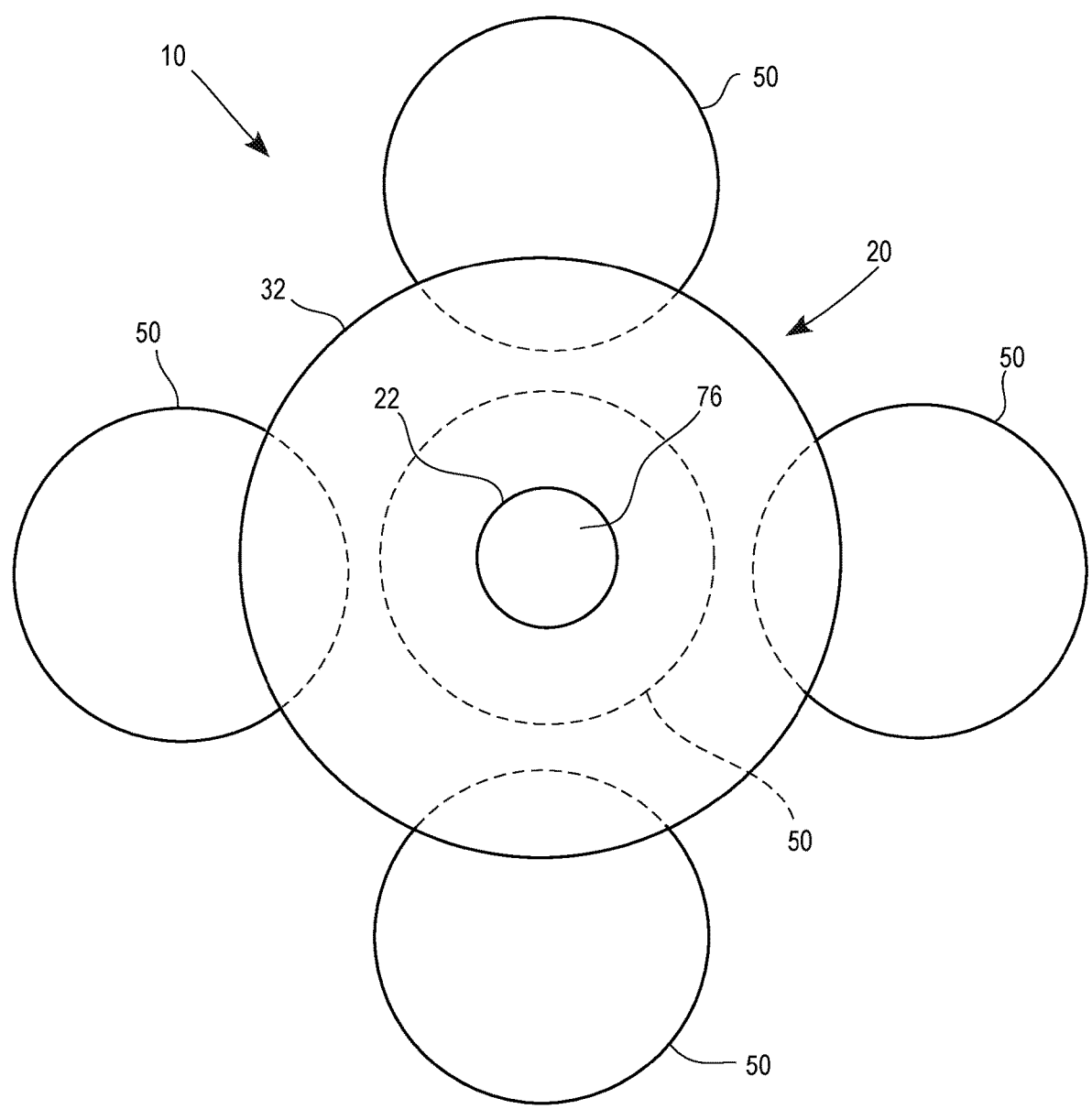
FIG. 2B is a top side schematic view of a combined large/coarse and fine bubble diffuser system using fine bubble disc diffusers in accordance with another embodiment of the present invention.
Figure 2C:
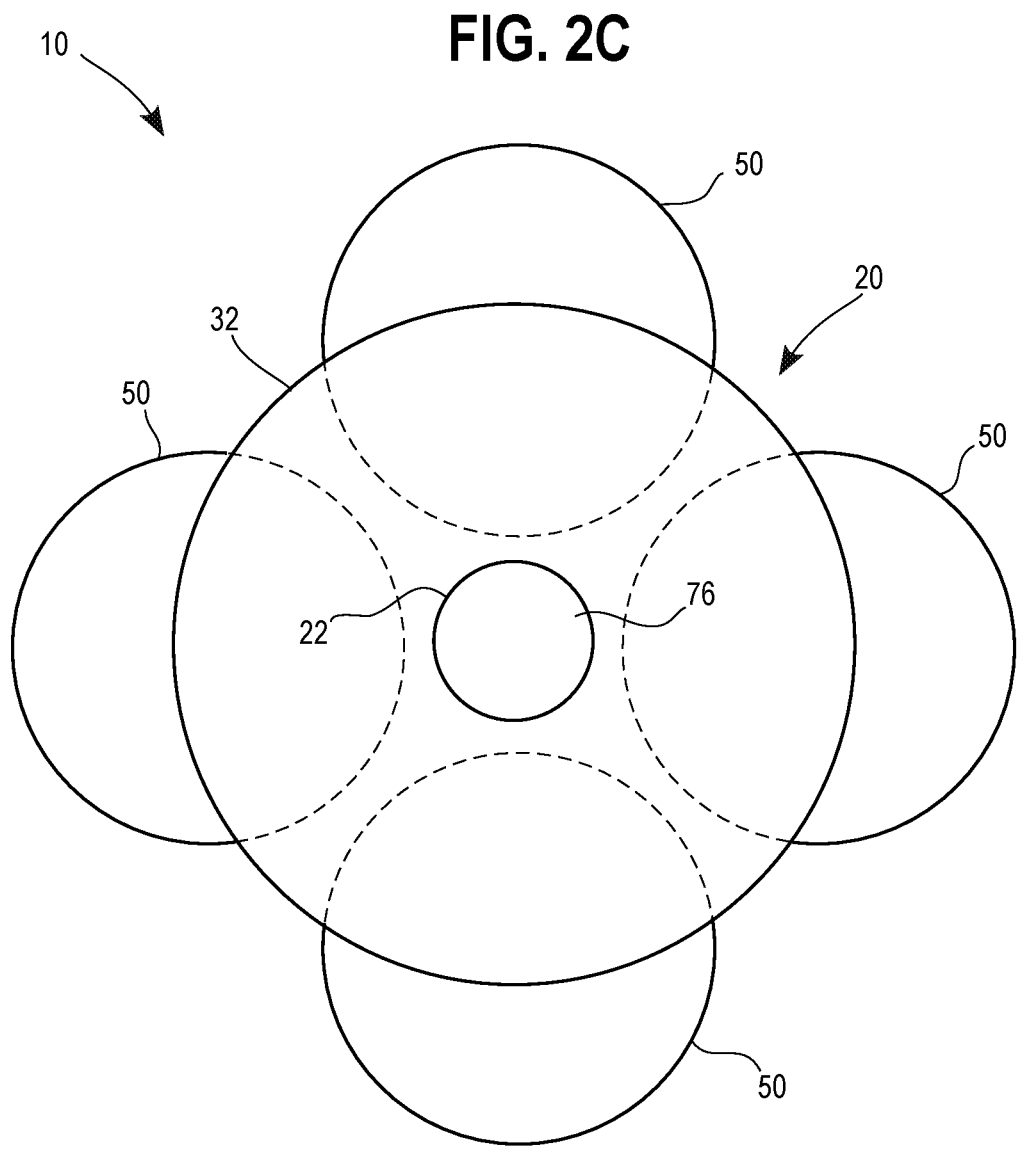
FIG. 2C is a top side schematic view of a combined large/coarse and fine bubble diffuser system using fine bubble disc diffusers in accordance with a further embodiment of the present invention.

The overall layout of the components, including the fine bubble diffusers 50, can vary for a number of reasons. The number of fine air disc diffusers per line is flexible, and depends on the area and size of the space they inhabit and the size and shape of the fine bubble diffusers 50. The fine bubble diffusers 50 can vary in size, and in disc form may be 7 inch, 9 inch, 12 inch, or other suitable diameters without limiting the scope of the invention. Similarly, the tube and panel fine bubble diffuser variations may also vary in size and length. While the size, location, and layout of the fine bubble diffusers 50 may vary based on the embodiment, in all embodiments the fine bubble diffusers 50 are located below the coarse bubble mixer(s), with a portion of the fine bubbles being captured by the accumulator 32 of the coarse bubble mixer 20 to activate coarse bubble mixing and aeration. FIGS. 2A, 2B, and 2C display three such embodiments, although it will be appreciated that many other designs, layouts, and configurations are within the scope of the present invention.

Figure 3:
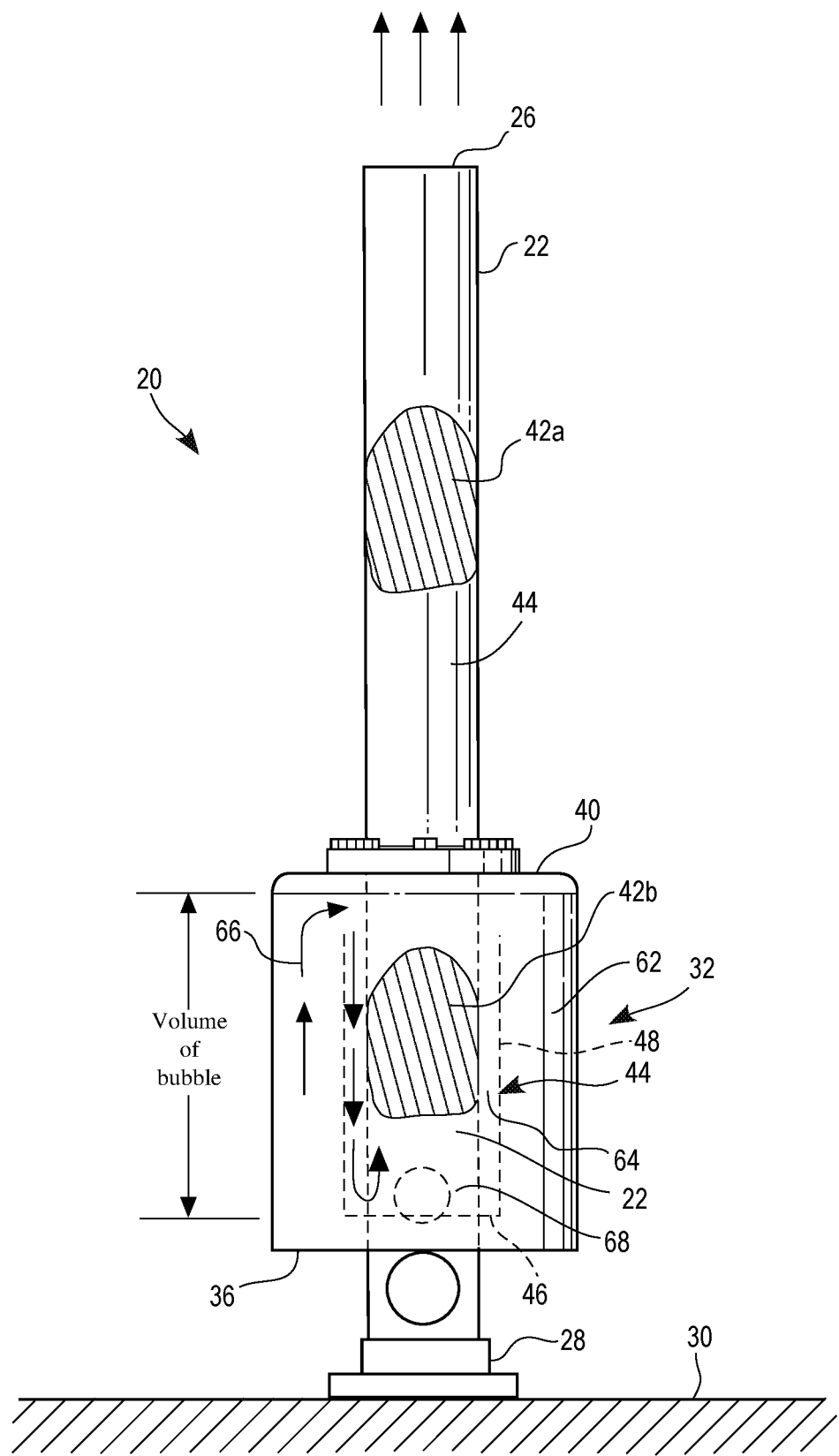
FIG. 3 is a side view of a large/coarse bubble mixer in accordance with one embodiment of the present invention.
Figure 4:
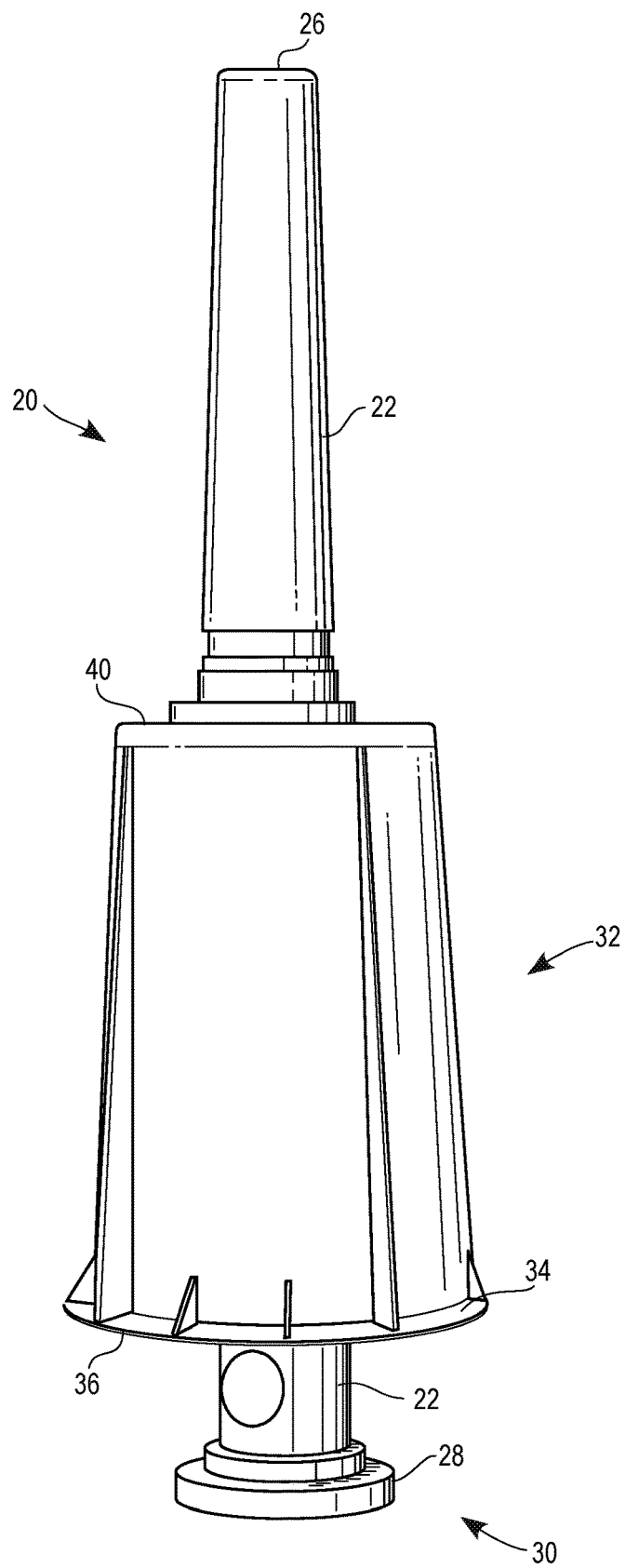
FIG. 4 is a side view of a large/coarse bubble mixer in accordance with one embodiment of the present invention.

The combined diffuser system 10 also contains a coarse bubble mixer 20 for intermittent releasing of a large bubble that mixes the wastewater. As best illustrated in FIG. 3, the coarse bubble mixer 20 generally comprises a generally vertically-extending central draft tube or stack pipe 22, an accumulator 32, and an upright cup-shaped member 44 arranged therebetween. The lower end of the stack pipe 22 may be affixed to a base 28, which is in turn attached to the ground or bottom of the treatment basin 30 or treatment area. An accumulator 32 surrounds the stack pipe 22 and can be attached thereto. The accumulator 32 may be in the form of an outer open bottom, inverted cup-shaped member having a downwardly-extending peripheral wall or skirt 34. The upright cup-shaped member 44 includes a closed lower wall or end 46 and an upwardly-extending peripheral wall or skirt 48. An outer open chamber 62 is defined between the upright cup-shaped member 44 and the accumulator skirt 34. Another chamber 64 is defined between the stack pipe 22 and the upright cup-shaped member 44.

The coarse bubble mixer 20 operates as an inverted siphon to generate one large bubble 42a to discharge during each discharge cycle. The coarse bubble mixer 20 receives oxygen or other gases through the air accumulator 32 located at the lower end of the mixer 20. This oxygen or other gas is diffused from one of more of the fine bubble diffusers 50 located beneath the accumulator 32. The oxygen or gas then proceeds upwardly and fills the accumulator 32. As the gases fill the contents of the accumulator 32, water is pushed out of the accumulator 32. Then, eventually when enough air has filled the accumulator 32, a seal is broken and the water pushes the air in the direction of the arrows 66, through chamber 64, and into the stack pipe 22 via an inlet 68 therein. In other words, as the accumulator 32 reaches maximum capacity, the internal pressure causes the gas in the accumulator 32 to enter the stack pipe 22, creating a siphon causing a release of all or most of the gas in the accumulator 32 as one large bubble 42a. The volume of the single large bubble 42a can have generally about the same volume as the specified volume defined within the accumulator 32, as demonstrated in FIG. 3. The gas enters the stack pipe 22 as one large, bullet-shaped bubble 42a. When the gas enters the stack pipe 22, it rises up through the pipe 22 until it reaches the opening 26 at the top of the pipe 22 and is released into the wastewater in the form of one large bubble 42a. Upon the large bubble 42a exiting the stack pipe 22 and entering the wastewater, it bursts and is broken up into two or more traditional coarse bubbles (not shown). The bursting of the single large bubble, plus the resultant of the multiple coarse bubbles, act as a disruptor in the wastewater, displacing and mixing the wastewater and the contents therein. The multiple coarse bubbles can also aerate the wastewater with adequate submergence in the liquid. The accumulation and discharge of air can be described as pulsing, in that subsequent large bubbles 42b are generated and released in a consistent and pulsating manner. The space between each of the large bubbles 42a and 42b may be filled with water in the form of pumpage.

The present invention is directed towards the combination of the coarse bubble mixer 20 and fine bubble diffusers 50 to achieve both effects simultaneously. Specifically, the present invention is designed to achieve maximum efficiency delivering oxygen from the fine gas bubble diffusers 50, then capturing a portion of the fine bubbles with the coarse bubble mixer 20 (i.e., reusing a portion of the oxygen or gas discharged from the fine bubble diffusers 50) as the oxygen or gas source for the coarse bubble mixer 20.

Unlike other known systems, the present invention does not distribute the same airflow between the coarse bubble mixer 20 and fine bubble diffusers 50. Air or gas is supplied to the fine bubble diffusers 50 as if they are acting independently from the combined system 10. By supplying gas or air to only the fine bubble diffusers 50, there will be uniform and consistent distribution to the fine bubble diffusers 50. When oxygen or gas is released from the fine bubble diffusers 50, as in any fine bubble diffuser embodiment, the released oxygen or gas is transferred into the wastewater for oxygen transfer. All of the air diffused from the fine air diffusers 50 is used for oxygen transfer. As a subsequent or additional use, a portion of the discharged air is captured by the coarse bubble mixer 20 for coarse bubble mixing, but only after oxygen transfer has occurred. In one preferred embodiment of the present invention, 100% of the air pumped into the system is discharged from the fine air diffusers 50, and there is no loss in efficiency resulting from capturing a portion of the discharged fine bubbles by the coarse bubble mixer 20.

In one embodiment of the present invention, as depicted in FIGS. 1-2, the coarse bubble mixer 20 will be mounted over the top of one or more of the fine bubble diffusers 50. The method of mounting the coarse bubble mixer 20 will vary based on the embodiment, and in one embodiment, it may be fixed to a ground base 30, concrete base, suspended from floating laterals, or may be mounted in other possible arrangements. The distance between the coarse bubble mixer 20 and the fine bubble diffuser 50 system can also vary, but the coarse bubble mixer 20 should generally be close enough to the fine bubble diffusers 50 so that it can effectively capture a portion or all discharged fine bubbles, depending on the embodiment.

As oxygen or gas is released from the fine bubble diffusers 50, a percentage of the released gas will be collected by the coarse bubble mixer 20 using the air accumulator 32. The amount of air captured by the air accumulator 32 of the coarse bubble mixer 20 varies based on several factors such as the size and shape of the skirt 34, the configuration and location of the fine bubble diffusers 50, and the location of the coarse bubble mixer 20 in relation to the fine bubble diffusers 50, among other factors. Depending on the embodiment, the coarse bubble mixer 20 could capture 5-100%, 10-60%, 20-30%, or other percentages of the air or gas discharged by the fine bubble diffusers 50. While the embodiment depicted in the figures includes one fine bubble diffuser 50 located directly beneath the skirt 34 and four fine bubble diffusers 50 located in a surrounding orientation, it will be appreciated that other configurations of diffuser 50 and skirt 34 orientations are within the scope of the present invention. In such an embodiment, it will be appreciated that a portion of the air discharged from the central fine bubble diffuser 50 may be captured the accumulator 32 and a portion of the air discharged from the central fine bubble diffuser 50 may pass up directly through the standpipe 22.

It will be appreciated that the configuration and location of the fine bubble diffusers 50 and coarse bubble mixer 20 can vary based on the embodiment, the source of gas for the coarse bubble mixer can also change based on the embodiment. In one such configuration within the scope of the present invention, one or more coarse bubble mixers 20 can be located above one another. In such an embodiment, coarse bubbles discharged from the bottom coarse bubble mixer 20 would be captured by a coarse bubble mixer located above the first. In such an embodiment the coarse bubble mixer 20 located above the first would capture air or gas through the air accumulator 32 in a similar fashion as a coarse bubble mixer 20 would capture air or gas from a fine bubble diffuser 50.

The size and shape of the bubble being discharged from the stack pipe 22 of the coarse bubble mixer 20 depends on various factors, including the diameter of the stack pipe 22, for example. It will be appreciated that each time the coarse bubble mixer 20 generates a bubble, the volume of the bubble is relatively constant. The size or volume of the generated bubble does not necessarily depend on the rate at which the air accumulator 32 captures air from the fine bubble diffusers 50, nor does it depend on the percentage of air being captured from the air accumulator 32, only the frequency of the discharge varies.

The amount, volume and frequency of the bubbles being discharged from the stack pipe 22 depend on various factors, including the size and volume of the accumulator 32 (including its cross-sections area and height), and the amount of air or gas capture by the accumulator 32, for example. While the skirt 34 of the accumulator 32 shown in the figures has a generally round cross-sectional shape, it will be understood the skirt 34 in other embodiments may be of a different shape, such as oval, square, rectangular, polygonal, or other suitable shape. The accumulator 32 may be of any suitable volumetric size, including but not limited to volumes between 1-4 ft$^3$ or larger, among other suitable volumes. The total volume of each bubble released by the coarse bubble mixer 20 is generally a fixed volume, equal to the volumetric size of the accumulator. When the accumulator 32 reaches maximum capacity, all air or gas in the accumulator 32 will be discharged as one large bubble 42a. The air accumulator 32 will not discharge unless maximum capacity is reached, ensuring a generally constant and consistent bubble size.

When the accumulator 32 reaches its maximum capacity, it will discharge the air or gas contained therein through the stack pipe 22 and into the wastewater. The rate at which the coarse bubble mixer 20 discharges depends on multiple factors, including but not limited to, the amount of gas or air supplied to the fine bubble diffusers 50, the number of fine bubble diffusers 50 in the system, the location of the coarse bubble mixer 20 relative to the fine bubble diffusers 50, and the volumetric size of the accumulator 32 of the coarse bubble mixer 20, among other factors.

In one embodiment of the invention, air or gas may be optionally supplied only to the fine air diffusers 50 and the coarse bubble mixer 20 may be not in use (e.g., it may be covered, removed, deactivated, etc.). In such a mode of operation, the system 10 could operate as a fine bubble diffuser system even if the coarse bubble mixer 20 is not in use.

Depending on the embodiment and the factors listed above, there are several different rates that the coarse bubble mixer 20 can discharge. In one embodiment, the coarse bubble mixer 20 may discharge once every five minutes or twelve discharges per hour. In another embodiment, the coarse bubble mixer 20 may discharge up to thirty times per minute or 1800 times per hour. These discharge rates are not exhaustive, and the rate at which the coarse bubble mixer 20 can discharge can vary. In each embodiment, the coarse bubble mixer 20 has an intermittent discharges or pulses. The discharge will occur after the coarse bubble mixer 20 collects enough air from the fine bubble diffusers 50 to fill the accumulator 32 and cause the air inside to discharge into the stack pipe 22 as a single large bubble 42a of air.

In this embodiment, the coarse bubble mixing is an additional or secondary function of the fine bubble diffuser 10. The coarse bubble mixer 20 has no direct connection to the source of the air or gas, and instead, is supplied air from the fine bubble diffusers 50. After the fine bubble diffuser 50 discharges air for oxygen transfer in the wastewater, a portion is subsequently collected by the coarse bubble mixer 20 for mixing and disrupting the water with maximum turbulence and for additional oxygenation when engineering with adequate submergence.

Additionally, the coarse bubble mixing is a subsequent use of the discharged air from the fine bubble diffusers 50. 100% of the air or gas is supplied to the fine bubble diffuser system, and that air or gas is used solely for fine bubble diffusion. The portion of the air or gas captured by the air accumulator of the coarse bubble mixer 20 will have a subsequent use of generating the large bubble 42a for coarse bubble mixing after it has transferred oxygen in the fine bubble diffusion system.

The combination coarse and fine bubble diffuser 10 has the benefit of improving the efficiency of the fine bubble diffusers 50. By disrupting and displacing the wastewater in the system, the coarse bubble mixer 20 can help break up sludge, algae, and other buildups on the surface or in the water. Additionally, the disruption caused by the coarse bubble mixer 20 can also disperse and displace the discharged oxygen produced by the fine bubble diffusers 50 and the aid the oxygen in traveling throughout the water volume and provides a secondary mixing to enhance the oxygen transfer or solids suspension.

This combination system provides a second use for a portion of the discharged air from the fine bubble diffuser 50. Unlike the other known systems that only get one use of discharged gas or air, the present invention gets two (2) uses out of a portion of the discharged gas or air from the fine bubble diffuser.

The invention may be configured in several different embodiments, depending on the configuration of the fine bubble diffuser layout, the placement of the coarse bubble mixer, as well as the environment the system will be operating in including but not limited to concrete tanks, concrete basins, reservoirs, lagoons, and other systems of wastewater and water treatment. The combined coarse and fine bubble diffuser may take embodiments including sitting on the floor with individual airlines, sitting on the floor with multiple units that can be driven off a single airline, floating air lateral system with units sitting on the floor, floating air lateral system with suspended units off the floor, piping on the floor and ballasted to hold on the floor with units also mounted on the floor, as well as other possible embodiments.

Figure 6:
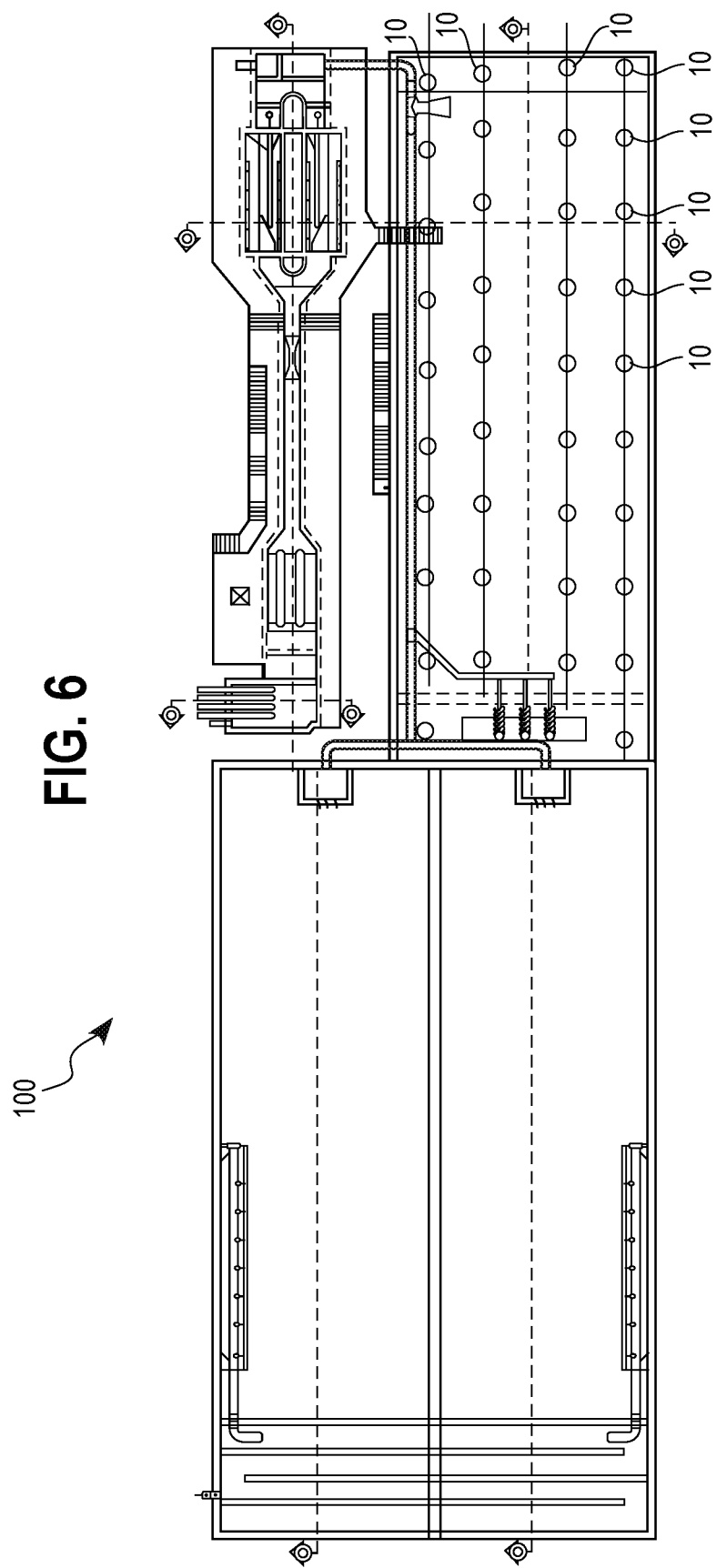
FIG. 6 is a schematic layout of a wastewater treatment system utilizing a plurality of combined large/coarse and fine bubble diffuser systems in accordance with one embodiment of the present invention.

As specifically illustrated in FIG. 6, a plurality of the systems 10 of the present invention may be installed in the tank or basin of a wastewater treatment system 100. As depicted, the system 10 may be spaced generally equally from one another for uniform mixing and aeration within the basin. Alternatively, the systems 10 may be provided in other arrangements.

In an alternative embodiment, completely independent air lines or pipes may supply air to the fine bubble diffusers 50 and the coarse bubble mixer 20. In such an embodiment, the fine bubble diffusers 50 may be supplied air by a first line and the coarse bubble mixer 20 may be supplied air by a second line. Such a system would give a positive split between fine bubble diffusers 50 and the coarse bubble mixer 20. In other words, the flowrate of air into the fine bubble diffusers 50 would be entirely independent from (and optionally different than) the flowrate of air into the coarse bubble mixer 20. This would permit for variable and desired rates of aeration and mixing that may be independent of one another. It would also permit variable aeration and independent mixer 20 frequency and intensity. In other words, the rate of mixing could be changed without having to change the amount of aeration from the fine bubble diffusers 50. Similarly, the amount of aeration from the fine bubble diffusers 50 could be changed without having to change the mixing. Further, in such an embodiment, air may be supplied only to the coarse bubble mixer 20 in one mode of operation if desired. Likewise, air may be supplied only to the fine bubble diffusers 50 in another mode of operation if desired. In this mode of operation the air discharged by the fine bubble diffusers 50 may or more not, depending upon configuration, be captured and reused by the coarse bubble mixer 20.

From the foregoing, it will be seen that this invention is one well adapted to attain all the ends and objects hereinabove set forth together with other advantages which are inherent to the structure and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for aerating and mixing wastewater within a treatment area, the system comprising:
    at least one fine bubble diffuser configured for discharging gas into the wastewater to aerate the wastewater;
    at least one large bubble mixer configured for releasing bubbles into the wastewater to mix the wastewater, wherein the large bubble mixer is located above the fine bubble diffuser to form a combined large bubble mixer and fine bubble diffuser as a single unit, wherein the large bubble mixer comprises:
        a generally vertically-extending stack pipe;
        an inlet port defined in a lower end of the stack pipe;
        an opening defined in an upper end of the stack pipe; and
        an accumulator having a peripheral skirt surrounding a portion of the stack pipe above the inlet port; and
    at least one first line supplying gas to the fine bubble diffuser.

2. The system of claim 1, wherein at least a portion of the gas discharged from the fine bubble diffuser is subsequently captured by the large bubble mixer.

3. The system of claim 2, wherein gas discharged from the fine bubble diffuser aerates the wastewater prior to being captured by the large bubble mixer.

4. The system of claim 2, wherein the gas captured by the large bubble mixer is accumulated within the large bubble mixer to generate a large bubble that, upon exiting the large bubble mixer, is broken into a plurality of smaller coarse bubbles.

5. The system of claim 4, wherein the large bubble mixer is configured to discharge a large bubble once an accumulator thereof becomes at least substantially filled with gas.

6. The system of claim 4, wherein the large bubble is released from an upper end of the large bubble mixer.

7. The system of claim 1, wherein the large bubble mixer includes an accumulator having a peripheral skirt located above the fine bubble diffuser.

8. The system of claim 1, wherein the fine bubble diffuser is located directly below an accumulator of the large bubble mixer.

9. The system of claim 8 further comprising additional fine bubble diffusers that are not fully located directly below the accumulator of the large bubble mixer.

10. The system of claim 1, wherein the large bubble mixer is adapted for operating as a siphon to generate one large bubble per discharge cycle.

11. The system of claim 1 further comprising at least one second line supplying gas to the large bubble mixer.

12. The system of claim 11, wherein the first line and the second line are controlled independently from one another.

13. The system of claim 1, wherein the system is configured for supplying gas only to the at least one fine bubble diffuser.

14. The system of claim 1, wherein the at least one fine bubble diffuser configured for discharging gas in the form of fine bubbles in the size range of about 0.5 mm to about 3.0 mm in diameter.

15. The system of claim 1, wherein the at least one fine bubble diffuser is at least one of a disc diffuser, a tube diffuser, and a panel diffuser.

16. A method for aerating and mixing wastewater within a treatment area, the method comprising the steps of:
    providing at least one fine bubble diffuser configured for discharging gas into the wastewater for aerating the wastewater;
    providing at least one large bubble mixer configured for releasing bubbles into the wastewater for mixing the wastewater, wherein the large bubble mixer is located above the fine bubble diffuser to form a combined large bubble mixer and fine bubble diffuser as a single unit, wherein the large bubble mixer comprises:
        a generally vertically-extending stack pipe;
        an inlet port defined in a lower end of the stack pipe;
        an opening defined in an upper end of the stack pipe; and
        an accumulator having a peripheral skirt surrounding a portion of the stack pipe above the inlet port; and
    supplying gas to only the fine bubble diffuser.

17. The method of claim 16 further comprising the step of capturing, with the large bubble mixer, gas discharged from the fine bubble diffuser.

18. The method of claim 17, wherein the gas captured within the large bubble mixer is captured for reuse by the large bubble mixer through additional oxygen transfer and additional mixing supplementing fine bubble activity.

19. The method of claim 16 further comprising the step of accumulating gas within the large bubble mixer to generate one large bubble per discharge cycle.

20. The method of claim 19 further comprising the step of releasing the large bubble from the large bubble mixer.

21. The method of claim 16, wherein all of the gas supplied to the unit is discharged from the at least one fine bubble diffuser.

22. A system for aerating and mixing wastewater within a treatment area, the system comprising:
    at least one fine bubble diffuser configured for discharging gas into the wastewater to aerate the wastewater;
    at least one large bubble mixer configured for releasing bubbles into the wastewater to mix the wastewater, wherein the large bubble mixer is located above the fine bubble diffuser, wherein the large bubble mixer comprises:
        a generally vertically-extending pipe;
        an inlet port defined in a lower end of the pipe;
        an opening defined in an upper end of the pipe; and
        an accumulator having a peripheral skirt surrounding a portion of the pipe above the inlet port; and
    at least one first line supplying gas to the fine bubble diffuser.

* * * * *